(12) United States Patent
Jaroch (10) Patent No.: US 10,880,092 B2
(45) Date of Patent: Dec. 29, 2020

(54) COMPRESSION AND MANIPULATION-RESISTANT FUZZY HASHING

(71) Applicant: Colossio, Inc., Chicago, IL (US)

(72) Inventor: Joseph A. Jaroch, Chicago, IL (US)

(73) Assignee: Colossio, Inc., Chicago, IL (US)

( * ) Notice: Subject to any disclaimer, the term of this patent is extended or adjusted under 35 U.S.C. 154(b) by 480 days.

(21) Appl. No.: 15/888,613

(22) Filed: Feb. 5, 2018

(65) Prior Publication Data

US 2019/0245692 A1    Aug. 8, 2019

(51) Int. Cl.
| | |
|---|---|
| H04L 9/32 | (2006.01) |
| G06K 9/00 | (2006.01) |
| H04L 9/06 | (2006.01) |
| G06F 21/60 | (2013.01) |

(52) U.S. Cl.
CPC .......... *H04L 9/3239* (2013.01); *G06F 21/602* (2013.01); *G06K 9/00577* (2013.01); *H04L 9/0643* (2013.01); *G06K 2009/0059* (2013.01); *H04L 2209/08* (2013.01); *H04L 2209/34* (2013.01)

(58) Field of Classification Search
None
See application file for complete search history.

(56) References Cited

U.S. PATENT DOCUMENTS

| | | | |
|---|---|---|---|
| 8,644,620 B1* | 2/2014 | Lam | G06F 13/10 382/209 |
| 9,026,615 B1* | 5/2015 | Sirton | H04L 67/2842 709/217 |
| 2009/0141932 A1* | 6/2009 | Jones | G06K 9/036 382/100 |
| 2012/0268471 A1* | 10/2012 | Khalvati | G06T 1/60 345/522 |
| 2014/0301640 A1* | 10/2014 | Hirano | G06T 5/002 382/165 |
| 2017/0161304 A1* | 6/2017 | Diggins | G06K 9/00744 |

* cited by examiner

*Primary Examiner* — Henry Tsang
(74) *Attorney, Agent, or Firm* — Barnes & Thornburg LLP (57) ABSTRACT

Systems and a method for compression and manipulation-resistant fuzzy hashing are provided. In one or more aspects, a system includes a network interface to receive an image object from a network, and a processor to process the image object. The processing includes generating pairs of random numbers using a hash of pixel data of the image object as a seed. The processing further includes identifying a number of coordinate pairs, within image pixels of the image object, such that coordinate values of each coordinate pair of the identified coordinate pairs approximately matches one pair of the random numbers. A number of first entropy values associated with first sub-areas corresponding to the identified coordinate pairs are determined. An anchor point within the image pixels is identified that has coordinate values corresponding to a sub-area that is associated with a highest entropy value among the determined first entropy values.

20 Claims, 6 Drawing Sheets

```
┌─────────────────────────────────────────────────────────────────┐
│ identifying a plurality of coordinate pairs, within image pixels of the │  52
│ image, wherein coordinate values of each coordinate pair of the │
│ identified coordinate pairs approximately matches one pair of random │
│ numbers of a plurality of pairs of random numbers │
└─────────────────────────────────────────────────────────────────┘
                                │
                                ▼
┌─────────────────────────────────────────────────────────────────┐
│ determining a plurality of first entropy values associated with a plurality │  54
│ of first sub-areas of the image pixels of the image that correspond to │
│ the identified coordinate pairs │
└─────────────────────────────────────────────────────────────────┘
                                │
                                ▼
┌─────────────────────────────────────────────────────────────────┐
│ determining a highest entropy value among the plurality of first entropy │  56
│ values and a sub-area of the first sub-areas corresponding the highest │
│ entropy value │
└─────────────────────────────────────────────────────────────────┘
                                │
                                ▼
┌─────────────────────────────────────────────────────────────────┐
│ identifying an anchor point within the image pixels of the image, the │  58
│ identified anchor point having coordinate values matching coordinate │
│ values of the determined sub-area │
└─────────────────────────────────────────────────────────────────┘
```

COMPRESSION AND MANIPULATION-RESISTANT FUZZY HASHING

TECHNICAL FIELD

The present disclosure generally relates to image authentication and more specifically relates to compression and manipulation-resistant fuzzy hashing.

BACKGROUND

The volume of digital content, especially pictures and videos, produced in the social media is growing at an enormous rate with hundreds of millions of photos uploaded per day on a single social media. This is already significantly outpacing the ability for analysis tools to prevent piracy and the illegal dissemination of images, and the problem may grow worse as creative image manipulators attempt to circumvent anti-piracy measures with subtle image manipulations. Cryptographic hashes (checksums) are appealing as being able to identify duplicates of shared images because they allow for very fast lookup once the hash is calculated. However, just slightly manipulating even a single pixel can result in a dramatically different output hash. This is intentional, as for the intent that the cryptographic hashes are built for, but it leaves the door open for attackers willing to make slight modifications to an image to bypass preventative measures. Therefore, more secure hashing processes that are resistant to these manipulations are needed.

SUMMARY

The disclosed system and methods provides for performing compression and manipulation-resistant fuzzy hashing of an image. The subject technology can produce a checksum or hash from contents of the image or a video frame to determine whether it is identical to the original source image, and can operate to match permutations and deviations from an original image, instead of the existing approaches that use a one-to-one relationship to uniquely identify an exact image.

According to certain aspects of the present disclosure, a system for compression and manipulation-resistant fuzzy hashing includes a network interface to receive an image object from a network (e.g., a social network), and a processor to process the image object. The processing includes generating pairs of random numbers using a hash of pixel data of the image object as a seed. The processing further includes identifying a number of coordinate pairs, within image pixels of the image object, such that coordinate values of each coordinate pair of the identified coordinate pairs approximately match one pair of the random numbers. A number of first entropy values associated with first sub-areas corresponding to the identified coordinate pairs are determined. An anchor point within the image pixels is identified that has coordinate values corresponding to a sub-area that is associated with a highest entropy value among the determined first entropy values.

According to certain aspects of the present disclosure, a system may include memory and a processor coupled to the memory. The processor receives an image from a network. The processor can identify a number of coordinate pairs, within image pixels of the image, based on multiple pairs of random number. The processor may determine a number of first entropy values associated with a number of first sub-areas of the image pixels of the image. Each sub-area corresponds to a coordinate pair of the identified coordinate pairs. An anchor point, within the image pixels of the image, associated with a center point of a sub-area of the first sub-areas of the image pixels is identified that has a highest entropy value among the first entropy values associated with the first sub-areas.

According to certain aspects of the present disclosure, a method of compression and manipulation-resistant fuzzy hashing includes identifying multiple coordinate pairs, within image pixels of an image. Coordinate values of each coordinate pair of the identified coordinate pairs approximately matches one pair of random numbers of a number of pairs of random numbers. A number of first entropy values associated with multiple first sub-areas of the image pixels of the image are determined. The determined first entropy values correspond to the identified coordinate pairs. A highest entropy value among the first entropy values, and a sub-area of the first sub-areas corresponding to the highest entropy value is determined. An anchor point within the image pixels of the image is identified. The identified anchor point has coordinate values matching coordinate values of the determined sub-area.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The subject technology provides a method and a system for producing a checksum or hash from contents of a subject image object (e.g., an image or a video frame, hereinafter "image"). The disclosed solution uses the checksum to determine that the image is identical to an original source image. The checksum is generated such that it can enable matching permutations and deviations from the original source image. This is in stark contrast to the conventional approach of seeking a one-to-one relationship to uniquely identify an exact image, which is not resistant to image manipulations.

The subject technology can move the state of the art forward, as attackers improve their ability to manipulate images in creative ways, by introducing multiple discrete approaches which can be applied to an individual image object to produce a corresponding fuzzy hash value. The disclosed solution ensures that the subsequent matching of the hash value can occur via a direct lookup of the hash value, instead of performing more heavyweight comparisons of representative features of an image which, while effective in small samples, can be non-scalable due to the non-linear increase in overhead.

Additionally, many current strategies for targeting image manipulation follow the approach of down-sampling the image to reduce the resolution to effectively blur the pixel data and to allow for fuzzy matches. This approach, while effective for minor manipulations of the image, can result in a considerable number of false positives in image comparisons depending on the extent of the down-sampling. Further, the approach is not capable of taking into account numerous other manipulation techniques used regularly by attackers over and above minor edits of the subject image.

In one or more implementations, the disclosed technology starts with the raw image data and extracts a number of samples across the image, with each sample representing a small portion (e.g., approximately 1%) of the overall pixel area of the image. Rather than splitting the image into a rigid grid, the process first finds the region of the image approximately containing the highest local entropy. To find the highest local entropy, the disclosed technique generates a stream of random numbers with a predictable starting seed. In some implementations, the predictable starting seed can be a hash of the overall image, for example, generated based on a secure hash algorithm (SHA) such as SHA 256. The randomized approach of the subject technology ensures that the precise starting point of the image search is not predictable.

Additionally, the subject technology avoids the need to sample the entire image for finding the highest local entropy, which can be quite time consuming. This is because, for the vast majority of images, the highest entropy point will be identified quicker when moving randomly as the highest entropy point will tend to be the focal point of the image (the center) versus processing it linearly, where the highest entropy point may require processing approximately half of the image data before encountering the relevant point.

In some implementations, each pair of the generated random numbers can be used as (x, y) coordinates within the image pixel data to read a set of pixels. The set of pixels is identified as the pixels enclosed within a circle around a point (x, y) with a radius R. In some implementations, the radius R can be within a range of about 1-3% of a dimension (e.g., the diameter) of the image.

The entropy of this region of pixels with radius R around the point (X, Y) may be calculated, for example, with the standard Shannon Entropy calculation based on the expression: $H(X)=\Sum_{i=1}^{n} P(x_i) I(x_i) = -\Sum_{i=1}^{n} P(x_i) \log_b P(x_i)$, where P is the probability mass function, I is the information content of the discrete random number X, b is the base of the logarithm used and can be either of the number 2, the Euler's number e, or 10. The corresponding units of entropy for different values of b are different, for example, for b=2, e, or 10, the units of the entropy would be bits, nats and bans, respectively. It is known that the nat is a natural unit of information or entropy when calculated using natural logarithm, and the ban is a logarithmic unit of information or entropy when calculated using base 10 logarithm. For example, for random variables x and y with the probability mass function P, the entropy is calculated using: $H(x, y)=P(x)I(x)+P(y)I(y)=-P(x)\log P(x) - P(y) \log P(y)$.

In order to find the highest entropy value, if calculated entropy is higher than the highest previously identified entropy, it is stored as the highest entropy. This process repeats for a set number of iterations, for example, between 15 and 30 iterations, to ensure a fair sampling of the image is taken.

Once the point of the highest entropy in the image pixel data is identified, it is used as an anchor point for the broader image analysis. The benefits of this technique are twofold. First, it prevents the analysis from being predictable as it varies from image to image. Second, it ensures that no artificial and meaningless boundaries are introduced in the analysis, as would occur if the image data were treated as a grid.

The broader image analysis occurs by continuing the sampling process from the anchor point, iterating throughout the image. The sampling and calculating the entropy of each sample continues with circles having a radius R (e.g., within a range of about 1-3% of the image width) and moving horizontally and vertically to cover the entire image until returning the starting anchor point again.

The output of the image sampling is an array of floating point values representing the entropy of each small section. The benefit of using entropy data rather than retaining raw pixel data is that the entropy data is not vulnerable to color manipulations. Whereas, using pixel data may allow imperceptible color changes impact the resultant hash calculation. Instead, the entropy data is more intrinsic to the underlying data of the image and would not be able to be changed without significantly impacting the visual perception of the image. Additionally, the entropy, when used in this approach, does not change even if a compression scheme, for example, a lossy joint photographic experts group (JPEG) encoding is applied to the image, as the artifacts introduced by the JPEG algorithm are insignificant enough to not impact the entropy of the image sample.

In one or more implementations, the standard deviation and mean of the set of floating values are calculated. In a next step, the entire values less than one standard deviation below the mean or more than one standard deviation above the mean entropy value for the image are removed from the set of floating values. This serves to reduce the image pixel data into just a representative sample of the original image pixel data, still covering the bulk of the image pixel data but ignoring areas which are susceptible to manipulation including, for example, white spaces.

In some implementations, the final set of entropy values is sorted from highest to lowest (or lowest to highest) and the floating point values are truncated at a fixed granularity (e.g., $\frac{1}{100}$) and the final checksum is produced over the remaining set of entropy values.

The benefit of this manipulation is that it allows the original image to be transposed, inverted, or otherwise manipulated without impacting the resultant checksum (final hash). If the samples were kept in their original sequence, horizontally flipping the image would result in a very different checksum, whereas, by forcing samples into a fixed sequence, most transpositions that would result in the image looking similar to the human eye will result in the same checksum.

The resultant checksum can be within a range of about 128 bits to 512 bits to represent the entire image reliably. The resultant checksum can then be stored in a database or queried against a database of hash tables of existing images. This requires only a linear lookup time, whereas standard fuzzy comparisons that need to inspect features of every other generated image may require an exponential or greater lookup time.

Example System Architecture

Figure 1:
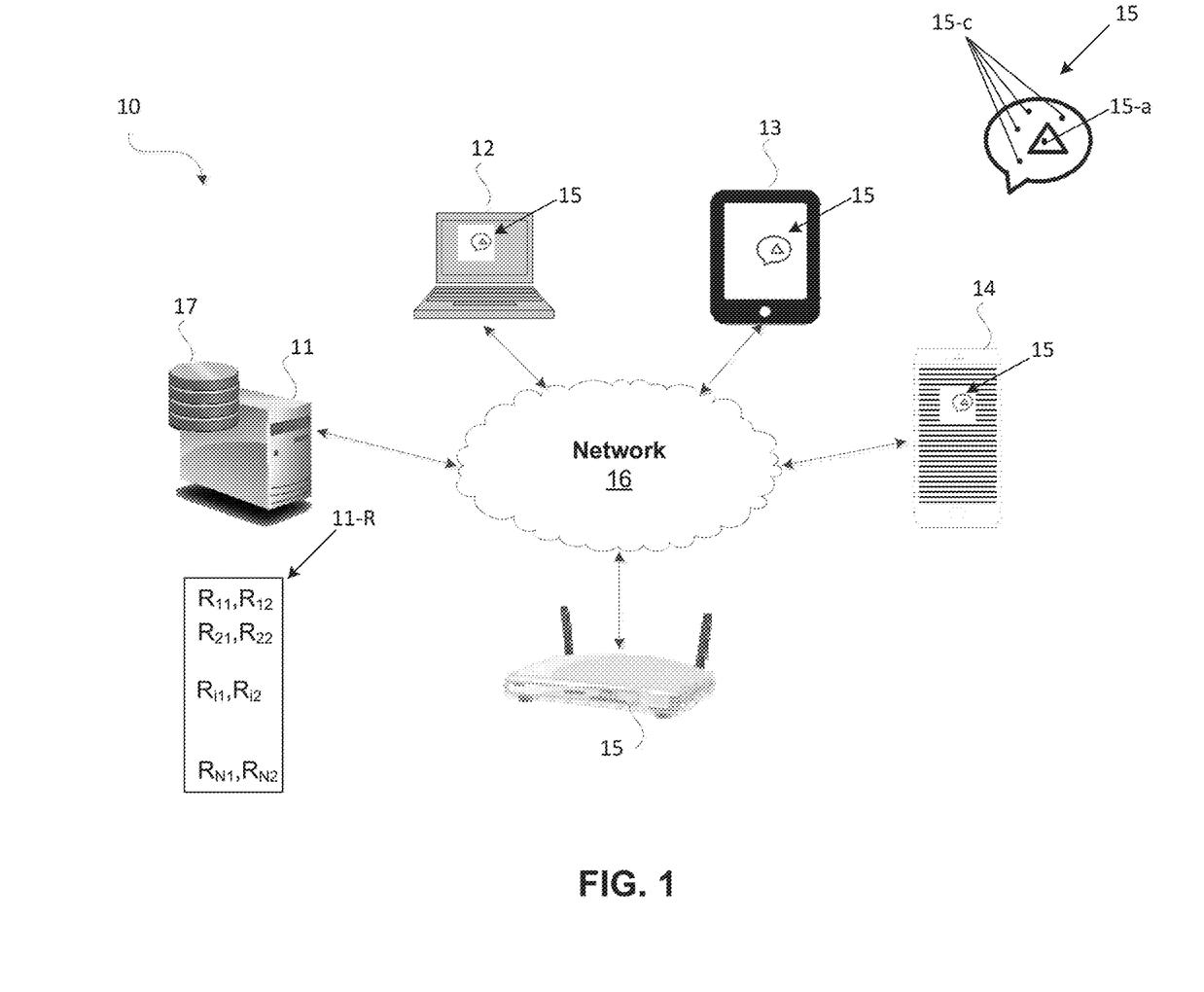
FIG. 1 illustrates an example environment in which the subject technology is implemented.

FIG. 1 illustrates an example environment in which the subject technology is implemented. The architecture 10 includes a server 11, a computing device 12, portable communication devices 13 and 14 and an access point 15 communicating (e.g., wirelessly) over a network 16. In some implementations, the server 11 is a local server or a cloud server capable of cloud computing. The computing device 12 may be a personal computer such as a laptop computer, the portable communication device 13 may be a tablet and the portable communication device 14 may be a smart phone or a personal digital assistant (PDA). The access point 15 may be a wireless access point that facilitates communication, via the network 16, of the server 11, the computing device 12 and the portable communication devices 13 and 14.

Examples of the network 16 include any one or more of a personal area network (PAN), a local area network (LAN), a campus area network (CAN), a metropolitan area network (MAN), a wide area network (WAN), a virtual private network (VPN), a broadband network (BBN), the Internet and the like. Further, the network 16 can include, but is not limited to, any one or more of the following network topologies, including a bus network, a star network, a ring network, a mesh network, a star-bus network, a tree or hierarchical network and the like.

In some implementations, the server 11 can receive and process one or more images 15, for example, in an email message or in a social media message from one or more social media networks (e.g., Facebook, Twitter, LinkedIn and the like). In one or more implementations, any of the computing device 12 and/or the portable communication devices 13 and 14 may communicate messages over the social media networks. In some aspects, the computing device 12 and/or the portable communication devices 13 and 14 may have capabilities, such as processing power and one or more suitable applications to perform processing of the image 15 as described herein. In some embodiments, the processing of the image may be implemented in one or more of the server 11, the computing device 12 and/or the portable communication devices 13 and 14. The server 11 may include or have access to a database 17, which may have stored image data including checksum values for a large number of images that are processed by the techniques of the subject technology and can be used as reference in the disclosed processing technique.

In some implementations, the processing of the image 15 may include generating a compression and manipulation-resistant fuzzy hashing. The processing of the image 15 may start by generating multiple pair of random numbers 11-R based on the image pixel data, and identifying multiple coordinate pairs 15-c, within image pixels of the image 15, such that coordinate values of each coordinate pair approximately matches one pair of random numbers (e.g., $R_{i1}$, $R_{i2}$). The processing further includes determining a number of entropy values associated with multiple sub-areas of the image pixels of the image. The determined first entropy values may correspond to the identified coordinate pairs. A highest entropy value among the entropy values and a sub-area corresponding to the highest entropy value are determined. An anchor point 15-a within the image pixels of the image is identified. The identified anchor point 15-a has coordinate values matching coordinate values of the determined sub-area, and is used to search or query the database 17 to check if the image is original or flagged as being, for example, copyright protected.

Figure 2:
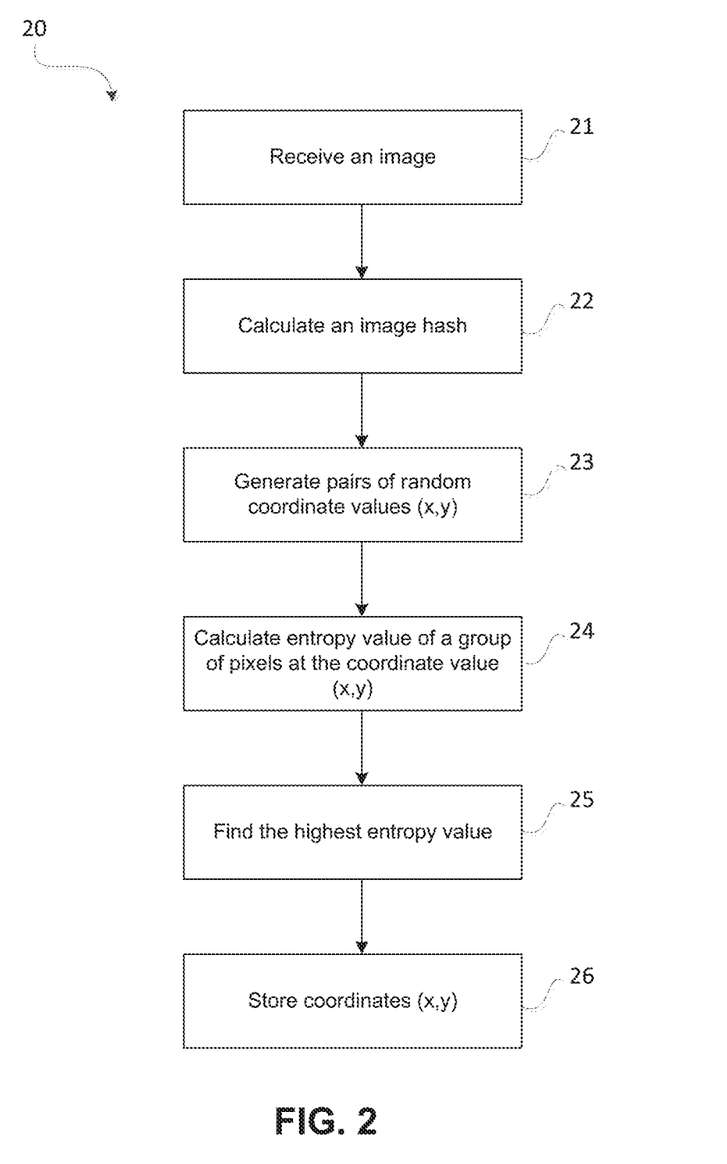
FIG. 2 is a flow diagram illustrating an example process for finding an anchor point among pixels of an image, according to certain aspects of the disclosure.

FIG. 2 is a flow diagram illustrating an example process 20 for finding an anchor point among pixels of an image, according to certain aspects of the disclosure. The process 20 starts at operation block 21 where the server 11 of FIG. 1 (e.g., a network interface of the server 11) receives an image (or a frame of a video clip) from a social media network (e.g., network 16 of FIG. 1). The image may be attached to an email message or a social network message or posted on a social media by a user of the computing device 12 or the portable communication devices 13 and 14 of FIG. 1. The server 11 (e.g., a processor of the server 11, hereinafter interchangeably referred to as "the processor") may process the image by first calculating a hash, at operation block 21, of the image pixel data. The hash may be calculated by any secure hash algorithm (SHA, e.g., SHA 256) that can be consistently used by the processor to generate image hashes. The processor may use the generated hash, which is uniquely related to the image being processed, as a seed for generating, at operation block 23, a number of pairs of random number. The seed generated based on the hash of the image at hand ensures that a predictable starting seed is used.

In one or more implementations, the processor may use the pairs of random numbers as representing a selected number of coordinate values (a,b) among the pixels of the image. The coordinate values (a,b) may be, for example, but are not limited to, (x,y) coordinates in a Cartesian system. For instance, to select 200 coordinate pairs (x,y) among pixels of the image, the processor generates 200 pairs of random number each representing a coordinate pair. In some implementations, the pairs of random numbers are properly normalized using dimensions of the image to be able to correctly represent image coordinate values. For example, the random numbers representing the x coordinate can be normalized with a width of the image and the random numbers representing the y coordinate can be normalized with a height of the image.

At operation block 24, for each selected coordinate (x,y) (e.g., based on random number pairs), a group of pixels enclosed in a sub-area are identified and a corresponding entropy value is calculated. The sub-area can be, for example, a circle with a radius R enclosing the group of pixels. In some implementations, other shapes of the subarea such as square, hexagonal, or the like can be used. The radius R may be related to a dimension of the image. For example, in one embodiment the radius R can have a value within a range of about 1% to 3% of a diameter (or other dimensions such as width or height) of the entire image. Each sub-area is associated with a coordinate pair (x,y) and encloses a number of pixels of the image, the information of which can be used to calculate an entropy value (e.g., a first entropy value) corresponding to that sub-area or that (x,y) coordinate pair. In some implementations, the entropy values may be calculated using the Shannon entropy formula discussed above, although, the subject technology is not limited to a single entropy calculation algorithm or formula.

At operation block 25, the processor may use a proper search algorithm to find the highest entropy value among the calculated entropy values for the sub-areas or (x,y) coordinate pairs. The highest entropy value corresponds to a sub-area or an (x,y) coordinate pair, which is identified as an anchor point among the pixels of the image. The processor may go through a number of (e.g., 15 to 30) iterations to ensure that a fair sampling of the image is taken. The anchor point may correspond to a portion of the image that includes more pixel information and is focal point of the subject process. The anchor point may then be used as a central point for the broader image analysis. The identification of the anchor point can prevent the analysis from being predictable, as it varies from image to image. Further, the anchor point ensures that no artificial, meaningless boundaries are introduced in the analysis as would occur if the image was treated as a grid. Once the anchor point is identified, at operation block 26, its corresponding (x,y) coordinate pairs are stored (e.g., in a memory location of the server 11).

Figure 3:
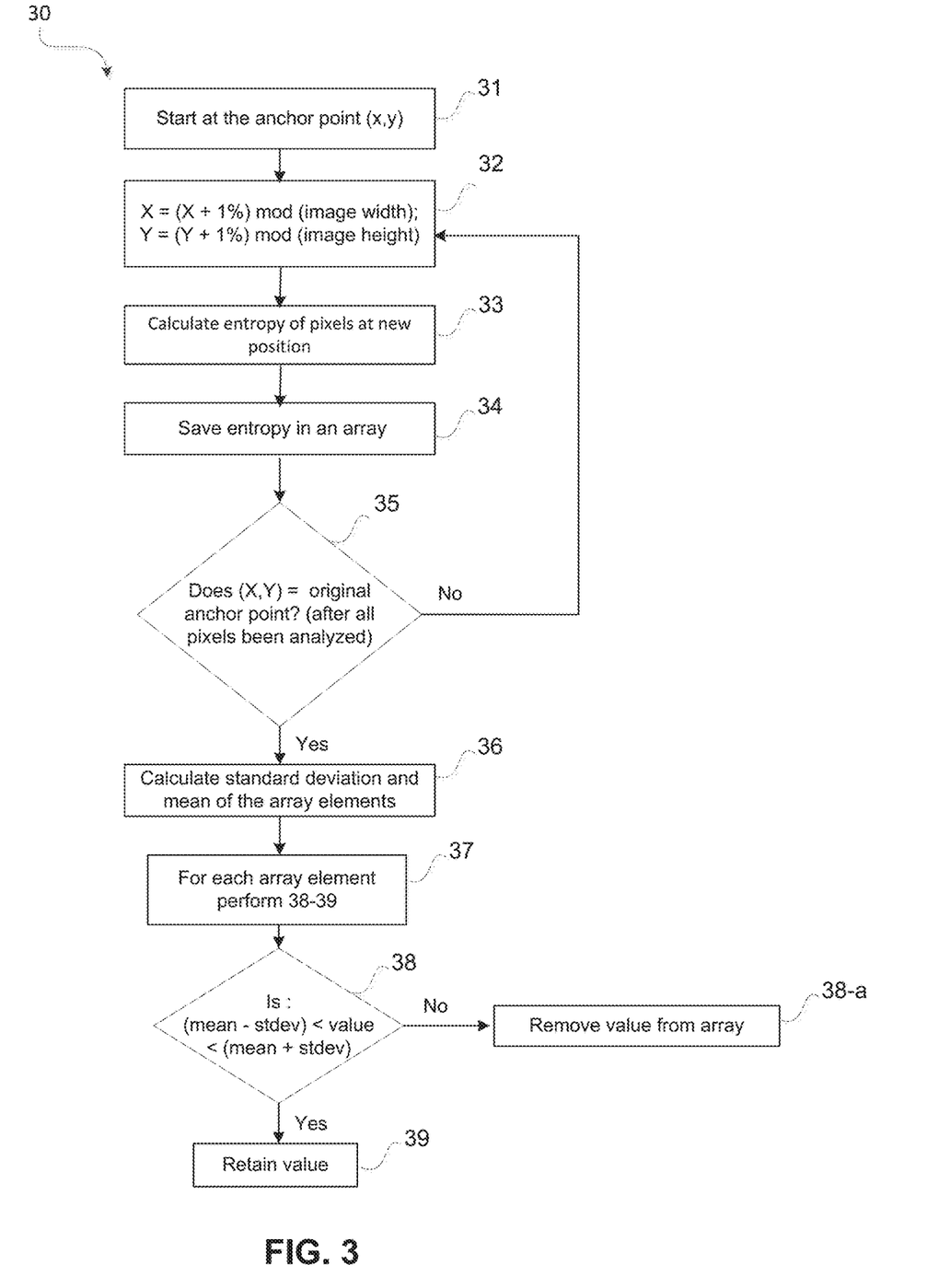
FIG. 3 is a flow diagram illustrating an example process for identifying an array of entropy values associated with an image object, according to certain aspects of the disclosure.

FIG. 3 is a flow diagram illustrating an example process 30 for identifying an array of entropy values associated with an image object, according to certain aspects of the disclosure. The process 30 starts, at operation block 31, with the anchor point (x,y) identified in the process 20 of FIG. 2. At operation block 32, the entire image is scanned by incrementing the (x,y) coordinate of the anchor point. In some implementations, the x coordinate may be incremented using the expression x=(x+a %) mod (image width), where the expression calculate modulus of (x+a %) and the image width, and parameter a can be within a range of about 1 to 3. Similarly, the y coordinate may be incremented using the expression y=(y+a %) mod (image width). At each new point, at operation block 33, an entropy value (e.g., a second entropy value) associated with the pixels enclosed in the corresponding sub-area is calculated (e.g., using Shannon entropy formula). At operation block 34, the calculated entropy value is saved in an entropy array. At control operation block 35, it is checked whether the process has reached the anchor point after sampling the entire pixels of the image (e.g., going forward from the anchor point to reach the end pixel of the image and starting over from the first pixel of the image and moving forward to reach the anchor point). If the entire image in not sampled, the control is passed to the operation block 32, where the iteration continues by moving to the next point after incrementing the values of current coordinate pair. The output of this image sampling process is the entropy array, which is an array of floating point values representing the entropy of each sub-area of the image.

If the entire image is already scanned, at operation block 36, for the entropy array elements (e.g., entropy values) saved in the entropy array (e.g., at operation 34), the processor calculates corresponding standard deviation (stdev) and mean values. At operation block 37, the process ensures that for each element of the entropy array the control is passed to operation blocks 38-39. At control operation block 38, the processor checks whether the entropy value is between (mean−stdev) and (mean+stdev) (e.g., within one stdev from the mean). If the entropy value is not within one stdev from the mean, at operation block 38-a, the processor removes entropy value from the entropy array. Otherwise, if the entropy value is within one stdev from the mean, at operation block 39, the entropy value is retained in the entropy array. In one or more implementations, in the control operation block 38, instead of the stdev, fractions or multiples of stdev may be used.

The benefit of using entropy data in the process 30, rather than retaining raw pixel data, is that the entropy data is not vulnerable to color manipulations. It is understood that using pixel data leads to allowing imperceptible color changes to potentially impact the resultant hash calculation. Instead, the entropy data used in the process 30 is more intrinsic to the underlying pixel data of the image, and is generally not susceptible to change unless the visual perception of the image is significantly changed. Additionally, the entropy data, as used in the process 30, does not change even if compression (such as lossy JPEG encoding) is applied to the image. This is because the artifacts introduced by the JPEG algorithm are insignificant enough to not impact the entropy data of the image samples.

Figure 4:
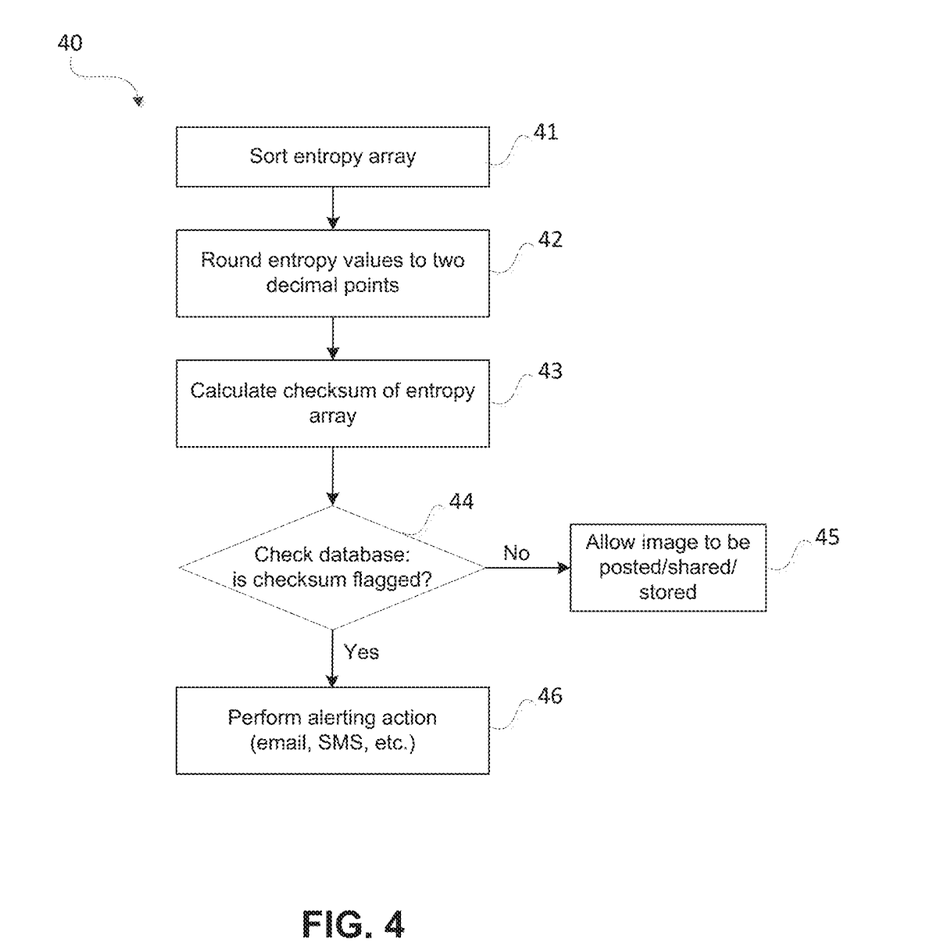
FIG. 4 is a flow diagram illustrating an example process for determining originality of an image object, according to certain aspects of the disclosure.

FIG. 4 is a flow diagram illustrating an example process 40 for determining originality of an image object, according to certain aspects of the disclosure. The process 40 starts at operation block 41, where the processor (e.g., of server 11 of FIG. 1) sorts (ranks) entropy values of the entropy array obtained in the process 30 in a descending (e.g., from high to low) order. In some implementations, the entropy values are ranked in an ascending (e.g., from low to high) order. At operation block 42, the processor rounds the ranked entropy values, for example, to two decimal points (e.g., to $1/100$ precision). At operation block 43, the processor calculates a checksum of the ranked and rounded entropy values. The processor uses the calculated checksum, at control operation block 44, to query a database (e.g., 17 of FIG. 1) of stored checksums to see if the calculated checksum matches a flagged checksum. If the calculated checksum does not match a flagged checksum, the image is considered appropriate and/or legal and, at operation block 45, the processor allows the image to be used, for example, posted, shared and/or stored in a social media or emailed. Otherwise, if the calculated checksum does match a flagged checksum, the image is considered inappropriate and/or illegal and, at operation block 46, the processor may initiate or perform an alerting action, for example, sending an email, a SMS or using other communication means to alert a person or a system. In some implementations, the flagged checksum may be associated with an image that is considered by the system inappropriate or against a policy, for example, a copyrighted image or an image including pornographic, hate, racist or other impermissible content.

Figure 5:
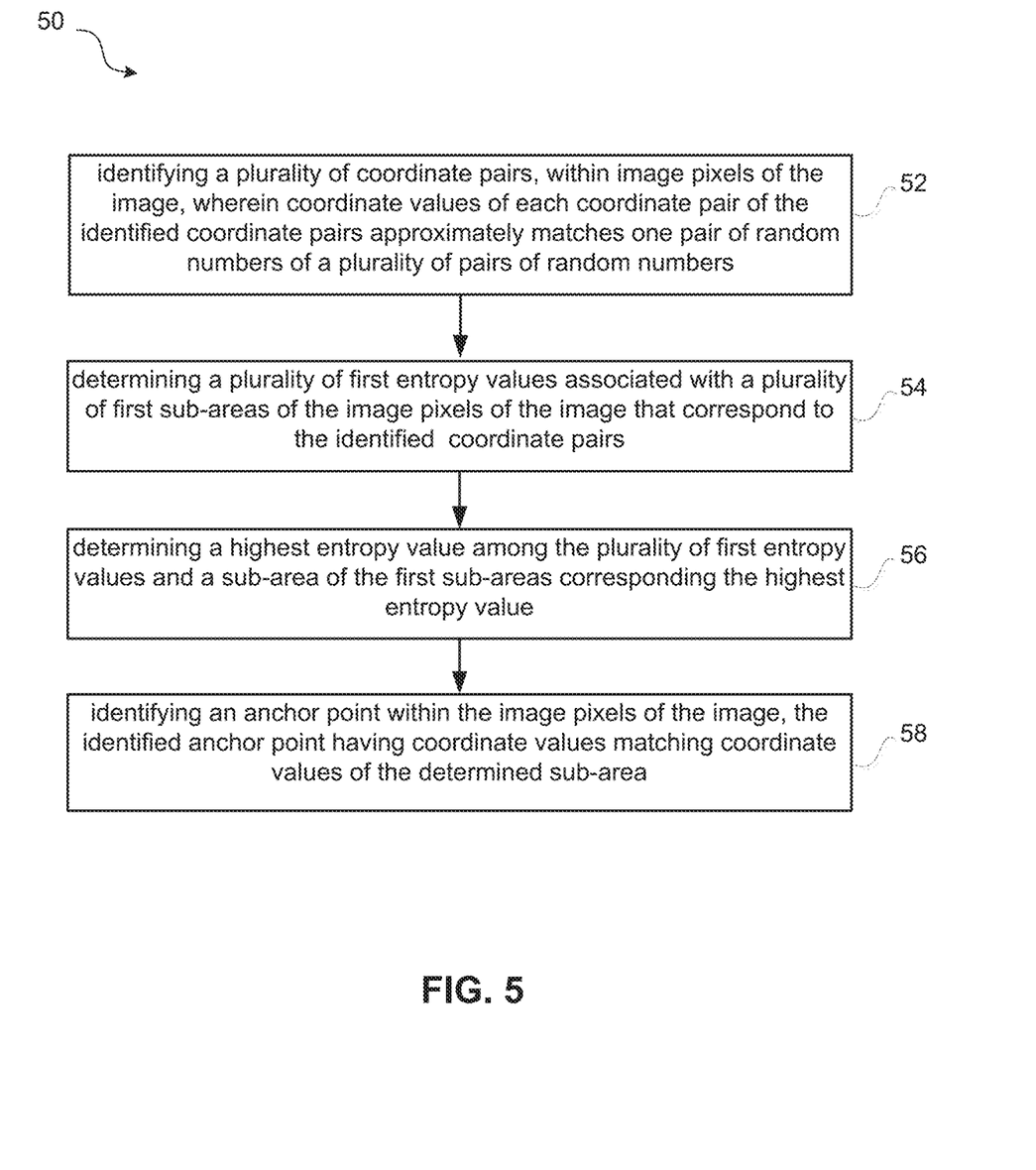
FIG. 5 is a flow diagram illustrating an example method of compression and manipulation-resistant fuzzy hashing, according to certain aspects of the disclosure.

FIG. 5 is a flow diagram illustrating an example method 500 of compression and manipulation-resistant fuzzy hashing of an image (e.g., 15 of FIG. 1), according to certain aspects of the disclosure. The method 500 includes identifying multiple coordinate pairs (e.g., 15-c of FIG. 1), within image pixels of the image. Coordinate values of each coordinate pair of the identified coordinate pairs approximately matches one pair of random numbers (e.g., $R_{r1}, R_{r2}$ of FIG. 1) of a number of pairs of random numbers (e.g., 11-R of FIG. 1) (52). A number of first entropy values associated with multiple first sub-areas of the image pixels of the image are determined (e.g., at 24 of FIG. 2) (54). The determined first entropy values correspond to the identified coordinate pairs. A highest entropy value among the first entropy values and a sub-area of the first sub-areas corresponding to the highest entropy value are determined (e.g., at 25 of FIG. 2) (56). An anchor point (e.g., 15-a of FIG. 1) within the image pixels of the image is identified. The identified anchor point has coordinate values matching coordinate values of the determined sub-area (58).

Figure 6:
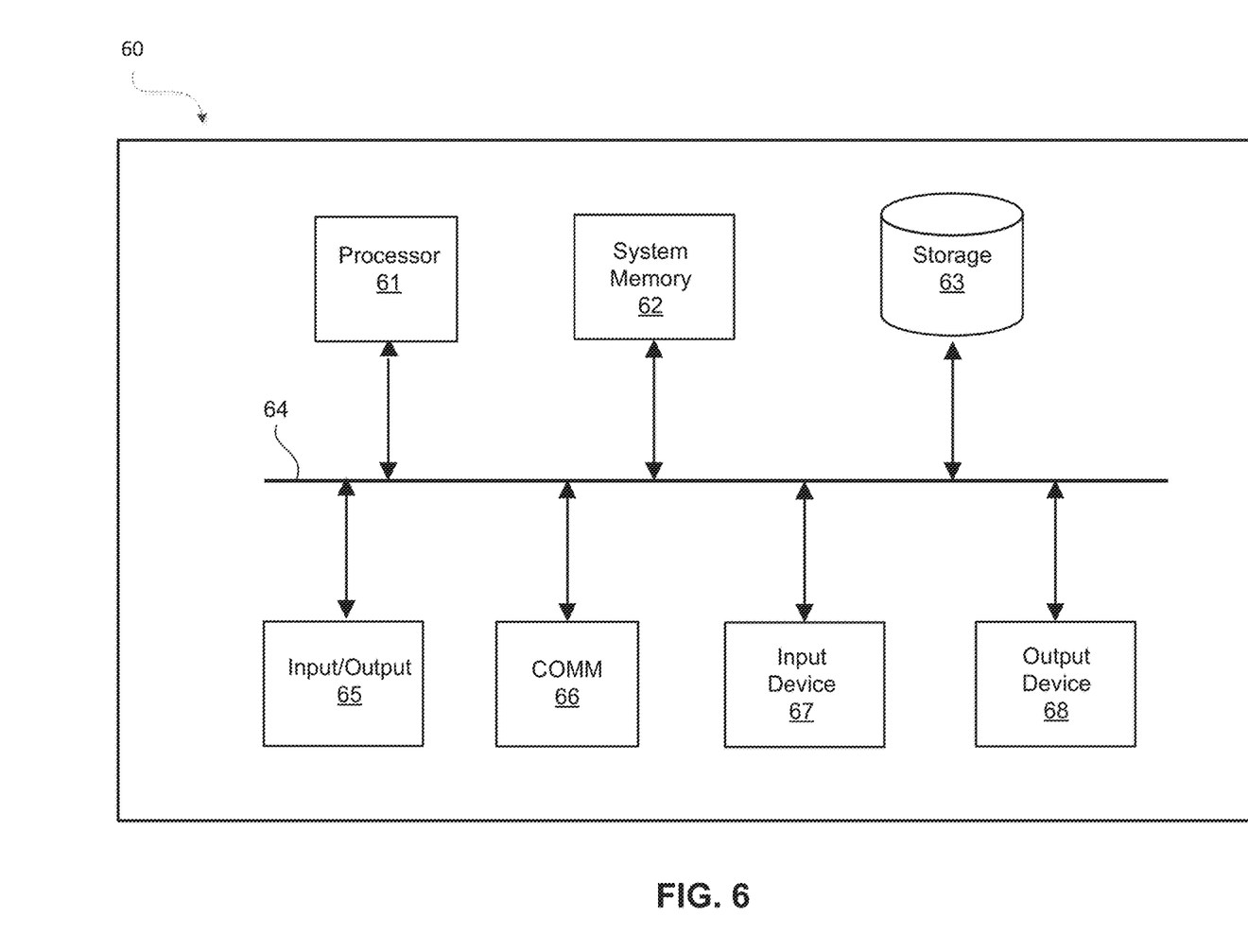
FIG. 6 is a block diagram illustrating an example computer system with which certain aspects of the subject technology can be implemented.

FIG. 6 is a block diagram illustrating an example computer system with which certain aspects of the subject technology can be implemented. In some aspects, the computer system 60 may represent the server 11, the computing device 12 and/or the mobile devices 13 and 14 of FIG. 1. In certain aspects, the computer system 60 may be implemented using hardware or a combination of software and hardware, either in a dedicated server or integrated into another entity or distributed across multiple entities.

Computer system 60 (e.g., server 11, the computing device 12 or the portable communication devices 13 and 14) includes a bus 64 or other communication mechanism for communicating information and a processor 61 coupled with bus 64 for processing information. According to one aspect, the computer system 60 can be a cloud computing server of an infra-structure-as-a-service (IaaS) and can be able to support platform-as-a-service (PaaS) and software-as-a-service (SaaS).

Computer system 60 can include, in addition to hardware, code that creates an execution environment for the computer program in question, e.g., code that constitutes processor firmware, a protocol stack, a database management system, an operating system, or a combination of one or more of them stored in an included memory 62, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 64 for storing information and instructions to be executed by processor 61. The processor 61 and the memory 62 can be supplemented by, or incorporated in, special purpose logic circuitry.

The instructions may be stored in the memory 62 and implemented in one or more computer program products, i.e., one or more modules of computer program instructions encoded on a computer readable medium for execution by, or to control the operation of, the computer system 60, and according to any method well known to those of skill in the art.

A computer program as discussed herein does not necessarily correspond to a file in a file system. A program can be stored in a portion of a file that holds other programs or data (e.g., one or more scripts stored in a markup language document), in a single file dedicated to the program in question or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 60 further includes a data storage device 63 such as a magnetic disk or optical disk, coupled to bus 64 for storing information and instructions. Computer system 60 may be coupled via input/output module 65 to various devices. The input/output module 65 can be any input/output module. Example input/output modules 65 include data ports such as USB ports. In addition, input/output module 65 may be provided in communication with processor 61, so as to enable near area communication of computer system 60 with other devices. The input/output module 65 may provide, for example, for wired communication in some implementations or for wireless communication in other implementations, and multiple interfaces may also be used. The input/output module 65 is configured to connect to a communications module 66. Example communications modules 66 may include networking interface cards, such as Ethernet cards and modems.

In certain aspects, the input/output module 65 is configured to connect to a plurality of devices, such as an input device 67 and/or an output device 68. Example input devices 67 include a keyboard and a pointing device, e.g., a mouse or a trackball, by which a user can provide input to the computer system 60. Other kinds of input devices 67 can be used to provide for interaction with a user as well, such as a tactile input device, visual input device, audio input device or brain-computer interface device.

According to one aspect of the present disclosure, at least portions of the processes 20, 30 and 40 and the method 50 can be implemented using the computer system 60 in response to processor 61 executing one or more sequences of one or more instructions contained in memory 62. Such instructions may be read into memory 62 from another machine-readable medium, such as data storage device 63. Execution of the sequences of instructions contained in main memory 62 causes processor 61 to perform the process steps described herein. One or more processors in a multi-processing arrangement may also be employed to execute the sequences of instructions contained in memory 62. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware or front end components.

In one aspect, a method may be an operation, an instruction or a function and vice versa. In one aspect, a clause or a claim may be amended to include some or all of the words (e.g., instructions, operations, functions or components) recited in other one or more clauses, one or more words, one or more sentences, one or more phrases, one or more paragraphs and/or one or more claims.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system for generating a compression and manipulation-resistant fuzzy hash for an image object, the system comprising:
 a network interface configured to receive an image object from a network; and
 a hardware processor configured to process the image object by:
  generating a plurality of pairs of random numbers using a hash of pixel data associated with the image object as a seed;
  identifying a plurality of coordinate pairs, within image pixels of the image object, wherein coordinate values of each coordinate pair of the identified plurality of coordinate pairs approximately matches one pair of random numbers of the plurality of pairs of random numbers;
  determining a plurality of first entropy values associated with a plurality of first sub-areas of the image pixels of the image object corresponding to the identified plurality of coordinate pairs; and
  identifying an anchor point within the image pixels of the image object, the identified anchor point having coordinate values corresponding to a sub-area of the plurality of first sub-areas of the image pixels that is associated with a highest entropy value among the determined plurality of first entropy values associated with the plurality of first sub-areas.

2. The system of claim 1, wherein the hardware processor is configured to store coordinate values of the identified anchor point, and wherein each sub-area of the plurality of first sub-areas comprise a circle with a radius value related to at least one dimension of the image object.

3. The system of claim 2, wherein the hardware processor is configured to determine a plurality of second entropy values corresponding to a plurality of second sub-areas of the image pixels of the image object.

4. The system of claim 3, wherein the hardware processor is further configured to determine the plurality of second sub-areas of the image pixels of the image object by first starting from the anchor point and moving forward to a last pixel of the image object and then moving forward from a first pixel of the image object to the anchor point.

5. The system of claim 4, wherein moving forward is performed by incrementing coordinate values by a predetermined value, and wherein the predetermined value is dependent on dimensions of the image object.

6. The system of claim 4, wherein the hardware processor is further configured to determine standard deviation and mean values of the plurality of second entropy values and to store values of a sub-set of the plurality of second entropy values that are within the standard deviation value from the mean value.

7. The system of claim 6, wherein the hardware processor is further configured to:
rank the values of the sub-set of the plurality of second entropy values in one of an ascending or a descending order,
round the ranked values of the sub-set of the plurality of second entropy values to a predetermined precision, and
determine a checksum of the rounded, ranked values of the sub-set of the plurality of second entropy values.

8. The system of claim 7, wherein the hardware processor is further configured to compare the checksum against a plurality of stored checksums of a database to determine whether the image object is original or is created based on an image corresponding to a flagged checksum of the stored checksums.

9. The system of claim 1, wherein the hardware processor is further configured to determine the hash of pixel data associated with the image object using a secure algorithm (SHA) 256, and wherein the plurality of coordinate pairs comprise Cartesian coordinates pairs.

10. The system of claim 1, wherein the hardware processor is further configured to determine the plurality of first entropy values using a Shannon entropy calculation scheme.

11. The system of claim 1, wherein the image object comprises an image or a frame of a video clip.

12. A system comprising:
memory; and
a processor coupled to the memory and configured to receive an image from a network, the processor configured to:
identify a plurality of coordinate pairs, within image pixels of the image, based on a plurality of pairs of random numbers;
determine a plurality of first entropy values associated with a plurality of first sub-areas of the image pixels of the image, each sub-area of the plurality of first sub-areas corresponding to a coordinate pair of the identified plurality of coordinate pairs;
identify an anchor point, within the image pixels of the image, associated with a center point of a sub-area of the plurality of first sub-areas of the image pixels having a highest entropy value among the plurality of first entropy values associated with the plurality of first sub-areas.

13. The system of claim 12, wherein the coordinate values of each coordinate pair of the identified plurality of coordinate pairs approximately matches one pair of random numbers of a plurality of pairs of random numbers generated using a hash of the image.

14. The system of claim 13, wherein the processor is further configured to determine the hash of the image by using a hash of pixel data associated with the image as a seed.

15. The system of claim 13, wherein the identified anchor point has coordinate values that correspond to the center point of the sub-area of the plurality of first sub-areas, and wherein each of the plurality of first sub-areas comprises a circle with a radius having a value equal to a fraction of a width of the image.

16. The system of claim 12, wherein the processor is further configured to:
identify a plurality of second sub-areas of the image pixels of the image by scanning pixels of the image while incrementing coordinate values by a predetermined value that is related to a dimension of the image, and
determine a plurality of second entropy values corresponding to the plurality of second sub-areas of the image pixels of the image.

17. The system of claim 16, wherein the processor is further configured to:
store values of a sub-set of the plurality of second entropy values that are within a standard deviation value from a mean value of the plurality of second entropy values, and
rank the values of the sub-set of the plurality of second entropy values in one of an ascending or a descending order.

18. The system of claim 17, wherein the processor is further configured to determine a checksum of rounded, ranked values of the sub-set of the plurality of second entropy values, and wherein the rounded, ranked values of the sub-set of the plurality of second entropy values are generated by rounding the ranked values of the sub-set of the plurality of second entropy values to a $\frac{1}{100}$ precision.

19. A method of generating a compression and manipulation-resistant fuzzy hash for an image, the method comprising:
identifying a plurality of coordinate pairs, within image pixels of the image, wherein coordinate values of each coordinate pair of the identified plurality of coordinate pairs approximately matches one pair of random numbers of a plurality of pairs of random numbers;
determining a plurality of first entropy values associated with a plurality of first sub-areas of the image pixels of the image that correspond to the identified plurality of coordinate pairs; and
determining a highest entropy value among the plurality of first entropy values and a sub-area of the plurality of first sub-areas corresponding the highest entropy value; and
identifying an anchor point within the image pixels of the image, the identified anchor point having coordinate values matching coordinate values of the determined sub-area.

20. The method of claim 19, further comprising forming an array of second entropy values corresponding to a group of second sub-areas, wherein sub-areas of the group of second sub-areas are obtained via scanning the image starting from the anchor point and ending in the anchor point, and further comprising ranking the array of second entropy values and rounding values of the ranked array of second entropy values and determining a checksum of the rounded values of the ranked array of second entropy values.

* * * * *